(12) United States Patent
Boatner et al.

(10) Patent No.: US 11,875,302 B2
(45) Date of Patent: Jan. 16, 2024

(54) VERIFICATION SYSTEMS AND METHODS FOR HIGH RISK PACKAGING OPERATIONS

(71) Applicant: Vision Engineering Inc., Sherman, MS (US)

(72) Inventors: Brian Boatner, Pontotoc, MS (US); Brian Hart, Tupelo, MS (US)

(73) Assignee: Vision Engineering, Inc., Sherman, MS (US)

(*) Notice: Subject to any disclaimer, the term of this patent is extended or adjusted under 35 U.S.C. 154(b) by 348 days.

(21) Appl. No.: 16/792,881

(22) Filed: Feb. 17, 2020

(65) Prior Publication Data

US 2020/0265378 A1   Aug. 20, 2020

Related U.S. Application Data

(60) Provisional application No. 62/806,845, filed on Feb. 17, 2019.

(51) Int. Cl.
| | | |
|---|---|---|
| *G06Q 10/0832* | (2023.01) | |
| *G06Q 30/0601* | (2023.01) | |
| *G06Q 10/0875* | (2023.01) | |
| *G06Q 50/04* | (2012.01) | |
| *G06K 7/14* | (2006.01) | |
| *G06K 7/10* | (2006.01) | |
| *G06Q 30/018* | (2023.01) | |
| *G06F 21/44* | (2013.01) | |
| *G01G 19/42* | (2006.01) | |

(52) U.S. Cl.
CPC ........ *G06Q 10/0832* (2013.01); *G01G 19/42* (2013.01); *G06F 21/44* (2013.01); *G06K 7/10366* (2013.01); *G06K 7/1413* (2013.01); *G06K 7/1417* (2013.01); *G06Q 10/0875* (2013.01); *G06Q 30/0185* (2013.01); *G06Q 30/0635* (2013.01); *G06Q 50/04* (2013.01)

(58) Field of Classification Search
CPC .......... G06Q 10/0832; G06Q 10/0875; G06Q 30/0185; G06Q 30/0635; G06Q 50/04; G01G 19/42; G06F 21/44; G06K 7/10366; G06K 7/1413; G06K 7/1417; G06K 7/14
USPC ............. 705/26.81, 26.8, 26.1; 235/375, 487
See application file for complete search history.

(56) References Cited

U.S. PATENT DOCUMENTS

| | | | |
|---|---|---|---|
| 2006/0020366 A1* | 1/2006 | Bloom ..................... | G07C 9/23 700/226 |
| 2008/0312957 A1* | 12/2008 | Luciano, Jr. ........ | G07F 17/0092 705/2 |
| 2014/0021253 A1* | 1/2014 | Carson ................... | G16H 20/13 235/380 |
| 2014/0237950 A1* | 8/2014 | Finken ..................... | G09F 3/02 53/473 |
| 2019/0108396 A1* | 4/2019 | Dal Mutto ........... | G07G 1/0063 |

* cited by examiner

*Primary Examiner* — Edwyn Labaze

(57) ABSTRACT

Verification systems and methods for high risk packaging are disclosed herein.

18 Claims, 3 Drawing Sheets

VERIFICATION SYSTEMS AND METHODS FOR HIGH RISK PACKAGING OPERATIONS

CROSS REFERENCE TO RELATED APPLICATION

This application claims priority to U.S. Provisional Patent Application Ser. No. 62/806,845 filed Feb. 17, 2019, the entirety of which is incorporated by reference herein.

TECHNICAL FIELD

The present invention relates generally to the field of verification systems, and more particularly to verification systems and methods for high risk packaging operations.

BACKGROUND

Typically, packaging operations and processes are known. One or more parts or components, labels, instruction booklets, and/or other components are assembled together manually as a kit, which are further sent to a customer for use. For example, medical device packaging commonly includes multiple labels (including multiple label types), one or more medical devices, an instruction booklet, and/or other components, labels, etc.

Current packaging processes leave medical device manufactures and other high-risk packaging operations open to liability issues related to non-conforming kits. This includes packages susceptible to product mix (substantial risk of comingles and/or mixed product batches), incomplete kits (substantial risk of missing component(s)), product quantity issues and human error. The consequences for packaging incorrect products, labels, and other components is be extremely high. This issue is well documented with the numerous recalls and corrective actions placed on said manufactures by the Food and Drug Administration (FDA) and similar regulatory bodies.

In typical cases, medical device packaging operations (or other high risk packaging operations) incorporate little or no verification processes or systems, for example, which commonly rely on the manual worker to ensure that the correct device(s), label(s), booklet(s), etc. are packaged appropriately and correctly to complete the kit. In most cases, without further verification of the kit, the kit is then sent to the customer for use. Quite often, kits received by the customer are incorrectly labeled, have one or more of the incorrect medical device components, or are otherwise faulty, incorrect and/or void.

Providing customers with faulty or incorrect kits is extremely dangerous and can present multiple problems and issues. With the Food and Drug Administration (FDA) imposing several compliance and regulatory requirements including severe fines for the manufacturer of the kit, providing systems and methods for correctly and accurately verifying packaging operations is sought. It is to the provision of verification systems and methods for high risk packaging operations meeting these and other needs that the present invention is primarily directed.

SUMMARY OF THE INVENTION

In example embodiments, the present invention provides verification systems and methods for high risk packaging operations.

In one aspect, the invention relates to systems and methods for providing 100% verification of all components that are required for a fully packaged kit. In example embodiments, the kits are packaged or assembled in low volume, high risk, manual packaging operations. In other example embodiments, the systems and methods can be configured for use with automated assembly lines and/or end-of-arm tooling or other robotic or automated devices.

In another aspect, the invention relates to systems and methods for packaging and verification systems for use by manual operators or by automation including robotics, end-of-arm tooling, and/or other componentry as desired.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Example embodiments of the present invention relate to verification systems and methods for packaging operations, and for example high risk packaging operations according to some example embodiments as described herein. In example embodiments, the verification systems and methods for high risk operations preferably insulate medical device manufactures, pharmaceutical manufactures and other high-risk packaging operations from errant and intentional mispackaging of one or more kitted products. As will be described herein, the present invention utilizes strategically placed sensors, machine readers and product verifiers at process points where there is the potential for error. Preferably, the verification systems and methods for high risk operations as will be described herein disclose preferred process flow operations and the hardware and other components provided to ensure patient safety and regulatory body satisfaction.

Figure 1:
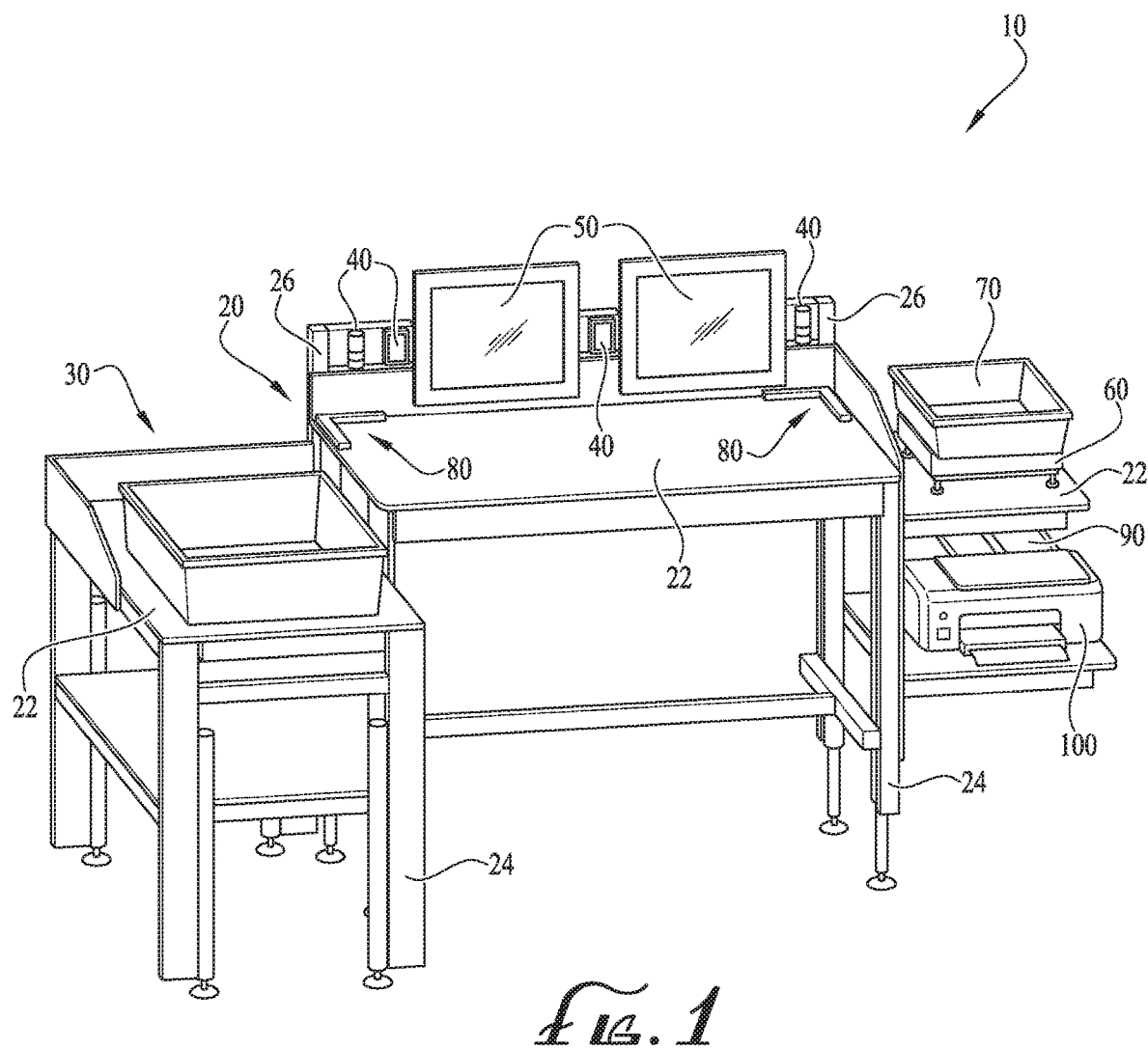
FIG. 1 shows a perspective view of a verification system according to an example embodiment of the present invention.

With reference to the drawing figures, wherein like reference numbers represent corresponding parts throughout the several views, FIG. 1 shows a verification system 10 according to an example embodiment of the present invention. In example embodiments, the verification system 10 comprises a support structure 20 comprising one or more work surfaces 22, frame support members 24 and bracket supports or mounts 26 for supporting at least one or more components or portions of the system 10. In example embodiments, the support structure 20 is intended to be placed on a floor or other support surface, for example, which may be confined within a clean room, manufacturing or assembly room or other location as desired. According to example embodiments, the frame support members 24 and mounts 26 are typically aluminum and comprise a desirable cross sectional shape, for example, a T-slot or other channeled extrusion such that the assembly and/or mounting thereof with each other and/or with other components of the system 10 provides a sturdy and durable structure for setting atop the floor, and for example, to allow a user and/or automation line and/or automated machines and/or tooling or componentry (or combinations thereof) from interfacing with the verification systems as described herein. In example embodiments, the work surfaces 22 are formed from a composite, polymer and/or plastic material. In optional example embodiments, other materials can be chosen for the work surfaces 22 or the frame support members 24 and mounts 26, for example, metals, composites, plastics, polymers, woods, natural materials, unnatural materials, synthetic materials, rubbers, epoxies and/or combinations thereof. In other example embodiments, the material of the work surfaces 22 can be chosen as desired.

Figure 2:
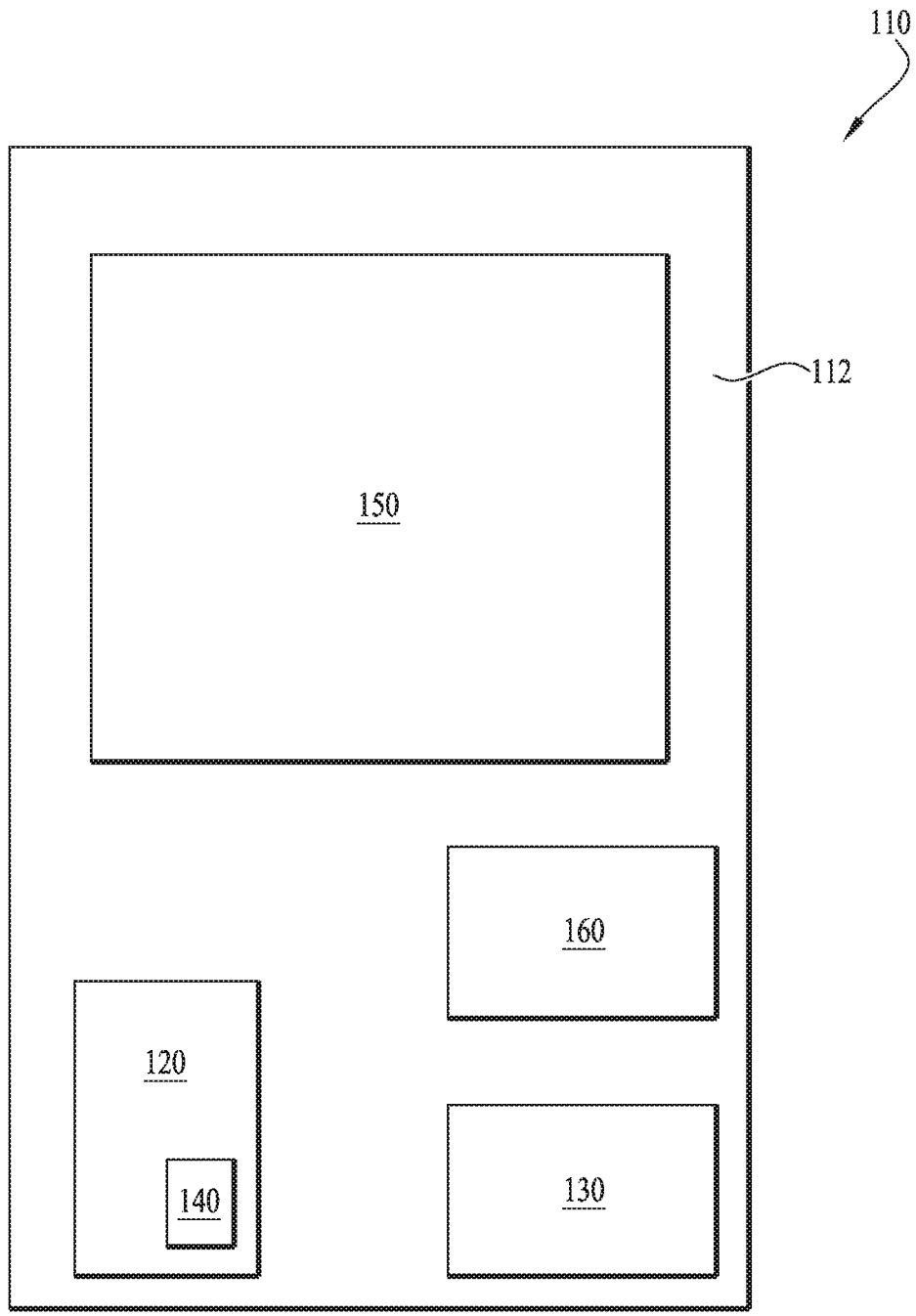
FIG. 2 shows a plan view of a completed kit according to an example embodiment of the present invention.

According to example embodiments of the present invention and as will be described in further detail below, the systems and methods as described herein are configured to provide 100% verification of all the components that are required for a fully packaged kit 110 in low volume, high risk, manual packaging operations (see FIG. 2). According to one example embodiment of the present invention, the completed kit 110 comprises a package or tray 112, one or more parts, components and/or devices 120, one or more outer labels 130, one or more inner labels 140, one or more instruction cards or booklets 150, and/or one or more identifying graphics or stickers 160. According to one example embodiment, the kit 110 comprises a medical device package containing multiple labels, multiple label types, a medical device, an instruction booklet, and/or other components. The system is designed to verify all components as the operator packages them, with as little additional handling as possible.

According to example embodiments, the package 112 is provided with one or more outer labels 130, and for example, is configured to contain at least a portion of the other contents of the kit 110. For example, according to one example embodiment, the package 112 is configured to contain and encapsulate one or more devices 120, one or more inner labels 140 and one or more instruction booklets 150. The one or more identifying graphics 160 can be applied as desired to the package 112, the outer labels 130, the devices 120 (and/or device 120 packaging), the inner labels 140 and/or the instruction booklets 150, for example, via printing, adhesive attachment, embedding RFID into device and/or packaging component, and/or other various objects, RFID, media, components, etc. that may be desired to incorporate in the kit 110 as described herein.

According to other example embodiments, the contents of the completed kit 110 can preferably be chosen as desired to comprise one or more additional packages or trays, parts, components and/or devices, outer labels, inner labels, instruction cards or booklets, identifying graphics or stickers, branding indicia, labels, barcodes, machine readable codes, or the identifiable shapes thereof, or for example, other desired packaging assemblies.

Referring back to FIG. 1 and according to one example embodiment, the verification system 10 generally comprises the support structure 20, a component staging area 30, component verification hardware 40, one or more display devices 50, a scale or other weight measurement device 60, one or more totes or bins 70, one or more registration or placement guides 80, an electronic device, processor or CPU 90, and a printer 100. In example embodiments, the system 10 is powered by electrically connecting a power cable extending therefrom to a power outlet. However, in other example embodiments, the system 10 as described herein can be configured to have an on-board backup battery system should the system need to depend on being powered off the grid, during peak electricity rates, or when electricity is out of commission. According to some example embodiments, the backup battery could provide at least 5 days to 2-weeks of use (about 18 hours per day).

In example embodiments, the component staging area 30 defines an area for staging all of the components required for the operation of creating a kit 110. Accordingly, any of the labels, devices, packaging, trays, etc. will be preferably provided in the component staging area for manipulation by a manual worker and/or automation.

In example embodiments, the component verification hardware 40 can include one or more devices or components such as 1d/2d barcode scanners, RFID readers, cameras, scales and/or other sensors as desired. Components within each kit can be identifiable by various methods. According to example embodiments, the component is identifiable by machine readable codes, such as 1d or 2d (e.g., 1-2 dimensional) bar codes, or for example radio-frequency identification (RFID). According to example embodiments, the component is identifiable by distinguishable by one or more dimensions, profiles, features, colors, textures, etc. Other identifiable or distinguishing properties can include weight, machine identifiable text (via OCR/OCV, such as part, lot, or ID number), machine verifiable graphic or image printed on or applied to the component and/or machine verifiable color of the component. According to another example embodiment, a human can input data such as the part, lot or ID number.

In example embodiments, at least one of the display devices 50 can provide current packaging instructions for the current kit that is being verified by the system 10, ensuring information is readily available to the manual worker. According to example embodiments, another one of the display devices 50 can be provided such that as the operator packages, the system prompts the manual worker with the required component and status of the kitting and verification process.

In example embodiments, the scale 60 is preferably provided so as to ensure that an operator packages a single kit, for example, rather than accidentally including more than one device or other component(s), etc. within the same package. Accordingly, a weight discrepancy that's not substantially close to the weight of a single kit or packaged device 110 may trigger a review of the package to verify accuracy.

In example embodiments, the bin 70 can be configured for attachment to a portion of the scale 60 to provide an area for assisting in the temporary capture and retainment of a kit 110 during final verification and/or weight inspection.

In example embodiments, the placement guides 80 can be provided on the work surfaces 22 as desired, for example, so as to allow for repetitive alignment of one or more components, devices, labels, etc., for example, such that they can be verified by an imaging device or other sensor that is generally aligned with the placement guides 80 such that a manual worker need only correctly orientate the component or other label, etc. and position it relative to the placement guide(s).

In example embodiments, the CPU or processing unit 90 preferably collects all data and verifies components for presence, accuracy, quantity, and time completed. In example embodiments, the processing unit comprises a processor comprising a hard-drive, RAM and software that is configured to communicate with the various component verification hardware 40, display devices 50, the scale 60, placement guides 80, and/or printer 100 to provide 100% verification of all the components that are required for a fully packaged kit 110 in low volume, high risk, manual packaging operations. In example embodiments, the processing unit 90 can be configured for accessing and/or linking with a server, network and/or cloud-based software or database such that data processed by the processing unit are saved to the linked server or other database.

In example embodiments, the printer 100 can be provided so as to permit a manual worker and/or automated end of tooling or other component to incorporate one or more labels, packaging information, instructions, and/or other indicia that relates to the kit 110, which can either be included or incorporated with the kit 110, and/or for example, can be kept for recording by the manufacturer.

According to example embodiments, the system of the present invention includes multiple input devices and a forced single piece flow.

Packaging is done manually by one or more workers or operators, with little or no packaging automation. In other example embodiments, automation can be incorporated with the systems and methods as described herein. For example, according to some example embodiments, a robot, end-of-arm tooling and/or other end effectors, conveyor belts, actuating devices, etc. can be configured for use with the systems and methods as described herein. According to example embodiments, the system 10 and/or any desired automation to be incorporated therewith, for example, so as to fully automate the packaging and verification process, and be configured and compatible with inputs and outputs, for example, such that the system 10 is configured to verify each component of the kit during the assembly thereof, for example, and on a single piece flow that would be substantially similar to a manual operator assembling the kits. As such, the automation, according to some example embodiments, could be interfaced with the system 10 (and processing using thereof), for example, so as to verify and/or provide input along the assembly process.

In example embodiments, orders or the number of kits to be assembled and verified are generally low volume (10s to 1000s of parts). However, in other example embodiments, the systems and methods as described herein can be configured to interface with automation such that high volumes are manageable. According to one example embodiment, the kits are configured such that the packaged part contains multiple unique identifiable items such as labels or instructions. In example embodiments, each or most components within the kit contain a human or machine-readable lot number, for example, so that they are lot traceable. In example embodiments, the packaging operations implemented on the systems and methods as described herein can be diverse. In example embodiments, each specific order is different from all other orders, and thus, the packaging prompts, instructions for assembly and verification, etc. can be easily changed to accommodate various orders of various devices, components and/or requirements.

In example embodiments, the systems and methods as described herein utilizes several methodologies to ensure that 1) all required components within the finished kit are present; 2) all required components within the finished kit are correct; 3) the required number of finished kits was packaged; 4) only components for a single kit are handled at one time; 5) once complete, finished kits are monitored to ensure they remain unchanged after verification; and 6) components must be handled/packaged and cannot be reused for verification on the next kit.

In example embodiments, the systems and methods as described herein create a packaging sequence such that each kit is packaged and verified based on a component bill of materials (BOM) for a specific part number. The component BOM includes all the components required for a single part to be packaged and is variable on a part to part basis, for example, wherein the packaging and/or verification. In example embodiments, the system enforces packaging order of each component by requiring the component to be verified as it is handled for packaging. This requires and enforces the standardization of packaging sequence by operators of the packaging cell. In example embodiments, the system utilizes inputs from multiple sensor types to verify all components in a kit (e.g., component verification software 40). This includes machine readable codes such as 1d and 2d barcodes, machine readable codes such as RFID, machine readable text, identification and verification of size and/or features by vision system, identification and verification by weight, and verification of manually entered data. In example embodiments, the system forces completed kits to be placed in a continuously monitored storage bin immediately after packaging of the kit is complete, and verifies that a valid, complete kit was added to the storage bin before allowing the packaging sequence to continue. In example embodiments, the system detects attempted packaging of valid components out of order and provides configurable warning functions. In example embodiments, the system detects attempted packaging of invalid components and provides configurable, second party credentialed error and resolution tracking. In example embodiments, the system detects improperly placed packaged units or units that are removed from the finished storage bin offering configurable, second party credentialed error and resolution tracking. In example embodiments, the system includes configurable elapsed time between scans and forces reset of an interrupted unit, further enforcing standard work and single piece flow. In example embodiments, the system includes the capability to be operated by human packaging operator or run autonomous via robotics operations.

Figure 3:
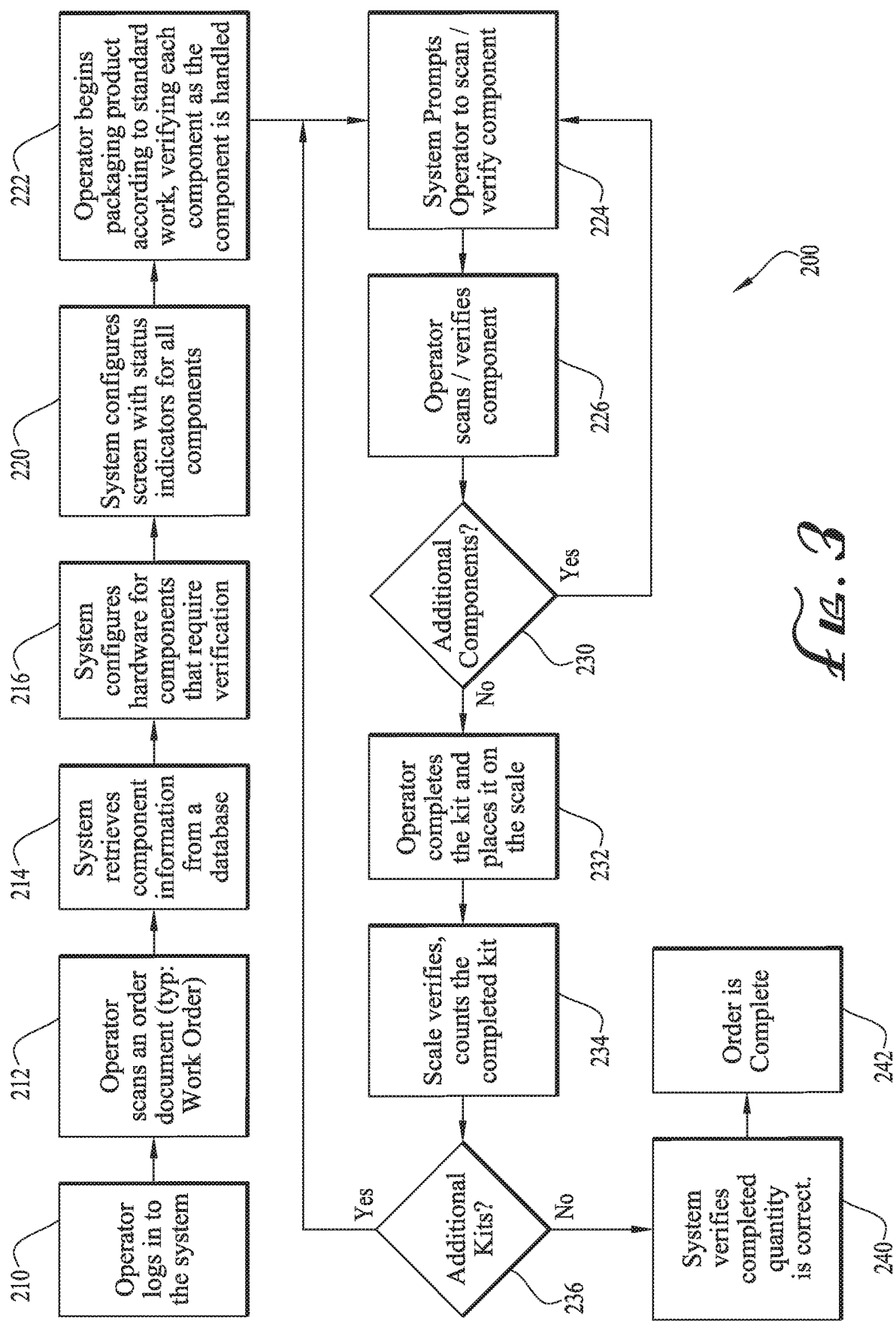
FIG. 3 shows a sequence of operation of the verification system of FIG. 1 according to an example embodiment of the present invention.

FIG. 3 shows a sequence of operation or method 200 of the verification system 10 of FIG. 1 according to an example embodiment of the present invention. According to example embodiments, the method 200 comprises the operator logging into the system at 210; the operator scanning an order document at 212 (e.g., a work order); the system 10 retrieving component information from a database at 214; the system 10 configuring hardware for components that require verification at 216; the system 10 configuring the screen or display devices 50 with status indicators for all the components at 220; the operator beginning to package the product according to standard work, verifying each component as the component is handled at 222; the system prompting the operator to scan/verify the component at 224; and the operator scanning/verifying the component at 226.

According to example embodiments, if additional components are required for the kit 110, the method 200 includes that system 10 again prompts the operator to scan/verify the additional component at 224. This loop is performed so long as there are additional components to be added to the kit 110. According to example embodiments, if no additional components are required for the kit 110, the method 200 includes the operator completing the kit and placing it on the scale at 232; and the scale verifying and counting the completed kit at 234. According to example embodiments, if additional kits 110 are to be kitted or packaged for the specific order, the method 200 includes that system 10 again prompts the operator to scan/verify the additional component at 224. This loop is performed so long as there are additional kits 110 to be assembled or packaged for the specific order. According to example embodiments, if no additional kits 110 are required for the order, the method 200 includes the system 10 verifying that the completed quantity is correct at 240; and completing the order at 242.

According to another example embodiment, the present invention comprises a method of an automated packaging and verification process. According to example embodiments, the method comprises the automated device logging into the system; the automated device scanning an order document at (e.g., a work order); the system 10 retrieving component information from a database; the system 10 configuring hardware for components that require verification; the system 10 configuring the screen or display devices 50 with status indicators for all the components; the automated device beginning to package the product according to standard work, verifying each component as the component is handled; the system prompting the automated device to scan/verify the component; and the automated device scanning/verifying the component.

According to example embodiments, if additional components are required for the kit 110, the method includes that system 10 again prompts the automated device to scan/verify the additional component. This loop is performed so long as there are additional components to be added to the kit 110. According to example embodiments, if no additional components are required for the kit 110, the method 200 includes the automated device completing the kit and placing it on the scale; and the scale verifying and counting the completed kit. According to example embodiments, if additional kits 110 are to be kitted or packaged for the specific order, the method includes that system 10 again prompts the automated device to scan/verify the additional component. This loop is performed so long as there are additional kits 110 to be assembled or packaged for the specific order. According to example embodiments, if no additional kits 110 are required for the order, the method includes the system 10 verifying that the completed quantity is correct; and completing the order.

While the invention has been described with reference to example embodiments, it will be understood by those skilled in the art that a variety of modifications, additions and deletions are within the scope of the invention, as defined by the following claims.

What is claimed is:

1. A method for packaging and verifying a lot of kitted devices on a verification system comprising a processing unit and verification hardware, the method including providing an operator; the operator logging into the processing unit of the system; the operator scanning an order document; the system retrieving information from a database of the processing unit regarding one or more components to be verified and packaged for each kitted device; the system configuring hardware for the one or more components that require verification; the system configuring the screen or display devices with status indicators for the one or more components; the operator beginning to package the one or more components according to standard work, verifying the one or more components as the one or more components are handled; the system prompting the operator to scan/verify the one or more components; and the operator scanning/verifying the one or more components, wherein the verification system enforces packaging order of each component by requiring the component to be verified as it is handled for packaging.

2. The method of claim 1, wherein, for each of the one or more components that are required for each kitted device, the system again prompting the operator to scan/verify the additional component.

3. The method of claim 1, wherein if no additional components are required for the kitted device, the operator completes the kitted device and places the same on the scale, wherein the scale verifies and counts the completed and packaged kitted device.

4. The method of claim 1, wherein if additional kitted devices are to be packaged then the method includes the system prompting the operator to scan/verify the additional one or more components to be packaged for one or more additional kitted devices.

5. The method of claim 1, wherein if no additional kitted devices are required, the method includes the system verifying that the completed quantity of the lot of kitted devices packaged and verified is correct.

6. The method of claim 1, wherein the lot of kitted devices are serialized.

7. The method of claim 1, wherein the verification system provides for serialization of the kitted devices such that each kitted device comprises a unique identifier specific to the one or more components packaged within the kitted devices.

8. The method of claim 1, wherein the one or more components comprise one or more finished components.

9. The method of claim 1, wherein the method is performed post manufacturing and prior to the delivery of one or more kitted devices to an end user.

10. A method for automated packaging and verifying a serialized lot of kitted devices on a verification system comprising a processing unit and verification hardware, the method including providing an automated device; the automated device providing credentials so as to access the processing unit of the system; the automated device scanning an order document; the system retrieving information from a database of the processing unit regarding one or more components to be verified and packaged for each kitted device; the system configuring hardware for one or more components that require verification; the system configuring the screen or display devices with status indicators for the one or more components; the automated device beginning to package the one or more components according to standard work, verifying each of the one or more components as the one or more components are handled, wherein the verification of each of the one or more components utilizes inputs from multiple sensor types; the system prompting the automated device to scan/verify the one or more components; and the automated device scanning/verifying the one or more components, wherein the system enforces packaging order of each component by requiring the component to be verified as it is handled for packaging.

11. The method of claim 10, wherein for each of the one or more components that are required for each kitted device, the system again prompting the automated device to scan/verify the additional component.

12. The method of claim 10, wherein if no additional components are required for the kitted device, the automated device completes the kitted device and places the same on the scale, wherein the scale verifies and counts the completed and packaged kitted device.

13. The method of claim 10, wherein if additional kitted devices are to be packaged then the method includes the system prompting the automated device to scan/verify the additional one or more components to be packaged for one or more additional kitted devices.

14. The method of claim 10, wherein if no additional kitted devices are required, the method includes the system verifying that the completed quantity of the lot of kitted devices packaged and verified is correct.

15. The method of claim 10, wherein the verification system provides for serialization of the kitted devices such that each kitted device comprises a unique identifier specific to the one or more components packaged within the kitted devices.

16. The method of claim 10, wherein the one or more components comprise one or more finished components.

17. A verification system for high risk, serialized and lot traceable packaging operations comprising:
   a support structure;
   a component staging area;
   component verification software comprising at least two input devices;
   one or more display devices;
   one or more registration guides; and
   a processing unit,
   wherein the verification system is configured to assist a manual operator and/or automation in assembling and packaging one or more kitted devices on a single piece flow, the kitted devices comprising a package or tray, one or more parts, components and/or devices, one or more outer labels, one or more inner labels, one or more instruction cards or booklets, and/or one or more identifying graphics or stickers, wherein each kitted device is serialized and lot traceable.

18. The verification system of claim 17, wherein the verification system provides for serialization of the kitted devices such that each kitted device comprises a unique identifier specific to the parts, components and/or devices packaged within the kitted devices.

* * * * *